US011963613B2

(12) United States Patent
Motley, II (10) Patent No.: US 11,963,613 B2
(45) Date of Patent: Apr. 23, 2024

(54) STORAGE DEVICE (71) Applicant: Randolph Motley, II, Omaha, TX (US)

(72) Inventor: Randolph Motley, II, Omaha, TX (US)

( * ) Notice: Subject to any disclaimer, the term of this patent is extended or adjusted under 35 U.S.C. 154(b) by 0 days.

(21) Appl. No.: 17/718,712

(22) Filed: Apr. 12, 2022

(65) Prior Publication Data
US 2022/0232970 A1 Jul. 28, 2022

Related U.S. Application Data (63) Continuation-in-part of application No. 17/242,994, filed on Apr. 28, 2021, now abandoned, which is a continuation-in-part of application No. 17/234,880, filed on Apr. 20, 2021, now abandoned.

(60) Provisional application No. 63/012,990, filed on Apr. 21, 2020.

(51) Int. Cl.
*A47B 46/00* (2006.01)
*A47B 81/00* (2006.01)
*A47B 51/00* (2006.01)

(52) U.S. Cl.
CPC .......... *A47B 46/005* (2013.01); *A47B 81/005* (2013.01); *A47B 2051/005* (2013.01); *A47B 2220/0097* (2013.01)

(58) Field of Classification Search
CPC .............. A47B 46/005; A47B 81/005; A47B 2051/005; A47B 2220/0097
See application file for complete search history.

(56) References Cited

U.S. PATENT DOCUMENTS

| | | | | |
|---|---|---|---|---|
| 3,155,299 A | * | 11/1964 | Horne | B60R 5/006 224/311 |
| 3,331,645 A | * | 7/1967 | Vercellotti | A47B 49/002 211/74 |
| 4,424,907 A | * | 1/1984 | Robb | A47B 81/005 224/311 |
| 4,699,437 A | * | 10/1987 | Genereaux | A47B 46/005 312/246 |
| 4,995,537 A | * | 2/1991 | Thedieck | B60R 7/14 224/547 |
| 5,094,351 A | * | 3/1992 | Barney | A47B 81/005 224/311 |
| 5,238,358 A | * | 8/1993 | Higgins | B62D 43/045 414/463 |
| 5,407,261 A | * | 4/1995 | Mercer | A47B 46/005 312/248 |

(Continued)

FOREIGN PATENT DOCUMENTS

DE 102004017663 A1 * 10/2005 ........... A47B 46/005
DE 202018104410 U1 * 12/2019 ............ A47B 51/00

*Primary Examiner* — Stanton L Krycinski
(74) *Attorney, Agent, or Firm* — Brennan, Manna & Diamond, LLC (57) ABSTRACT

This present invention relates to a ceiling mounted gear storage unit for storing and protecting gear, for example, fishing rods and reels. The storage unit includes an inconspicuous frame having a base with a plurality of retention grooves, carabiners, or bands; and, a cable and pulley system or electric motor and gear system to raise or lower the gear storage unit. The storage unit can be controlled using a remote application or other transmitter to operate the storage unit. An electronic lock mechanism can include an access code for providing access to the storage unit. The storage unit can be mounted to a ceiling joist(s) using wood screws.

12 Claims, 7 Drawing Sheets

(56) References Cited

U.S. PATENT DOCUMENTS

| | | | | |
|---|---|---|---|---|
| 5,460,280 A * | 10/1995 | Feddeler | A47F 5/0087 | 211/116 |
| 5,544,797 A * | 8/1996 | Silva | B60R 7/08 | 224/311 |
| 5,595,028 A * | 1/1997 | Handzlik | E04B 9/003 | 52/39 |
| 5,649,751 A * | 7/1997 | Longhurst | A47B 46/005 | 248/318 |
| 5,725,293 A * | 3/1998 | Wilkening | E04H 6/42 | 211/116 |
| 5,772,295 A * | 6/1998 | Sundmark | A47B 46/005 | 312/246 |
| 5,954,410 A * | 9/1999 | Noellert | A47B 46/005 | 312/242 |
| 6,276,539 B1 * | 8/2001 | Richbourg | A47B 81/005 | D6/552 |
| 6,354,682 B1 * | 3/2002 | Nott | E04H 6/42 | 52/39 |
| 6,357,842 B1 * | 3/2002 | Nott | A47B 46/005 | 52/39 |
| 6,550,878 B2 * | 4/2003 | Nott | E04H 6/42 | 52/39 |
| 6,655,646 B2 * | 12/2003 | Johnson | A47B 46/005 | 248/286.1 |
| 7,246,865 B1 * | 7/2007 | Merrell, II | A47B 46/005 | 312/248 |
| 8,136,897 B2 * | 3/2012 | Mascari | A47B 46/005 | 16/342 |
| 8,443,991 B1 * | 5/2013 | Ivey, III | A47B 51/00 | 211/116 |
| 8,579,081 B2 * | 11/2013 | Richey | E06C 1/383 | 182/77 |
| 8,800,788 B1 * | 8/2014 | Guidry | B60R 9/08 | 224/922 |
| 8,967,742 B1 * | 3/2015 | Huewitt, Jr. | A47B 51/00 | 312/248 |
| D728,261 S * | 5/2015 | Hicks | D6/552 | |
| 9,420,881 B2 * | 8/2016 | Reid | A47B 51/00 | |
| 9,572,427 B2 * | 2/2017 | Klooth | A47B 96/07 | |
| 9,603,449 B1 * | 3/2017 | Evans | A47B 81/005 | |
| 9,862,328 B2 * | 1/2018 | Smith | B60R 7/08 | |
| 9,888,772 B2 * | 2/2018 | Quinto | A47B 81/005 | |
| 11,046,399 B2 * | 6/2021 | Builder | B63B 32/83 | |
| 2005/0115861 A1 * | 6/2005 | Copeland | A47B 46/005 | 206/527 |
| 2005/0248241 A1 * | 11/2005 | Ceglarski | A47B 46/005 | 312/245 |
| 2006/0255701 A1 * | 11/2006 | Verneuille | A47B 46/005 | 312/319.6 |
| 2010/0108627 A1 * | 5/2010 | Lupinacci | A47B 46/005 | 211/116 |
| 2012/0234505 A1 * | 9/2012 | Hartwig | E06B 7/28 | 248/220.22 |
| 2014/0190221 A1 * | 7/2014 | Jiang | A47G 29/10 | 206/525 |
| 2015/0145393 A1 * | 5/2015 | Young | A47B 46/005 | 312/246 |
| 2016/0135593 A1 * | 5/2016 | DeLorean | E04B 1/941 | 312/247 |
| 2016/0143437 A1 * | 5/2016 | Gabriel | A45F 3/10 | 224/153 |

* cited by examiner

STORAGE DEVICE

CROSS-REFERENCE TO RELATED APPLICATION

The present application claims priority to, and the benefit of, U.S. patent application Ser. No. 17/242,994, which was filed on Apr. 28, 2021, which claims priority to, and the benefit of, U.S. patent application Ser. No. 17/234,880, which was filed on Apr. 20, 2021 and claims priority from U.S. Provisional Application No. 63/012,990, which was filed on Apr. 21, 2020 and is incorporated herein by reference in its entirety.

FIELD OF THE INVENTION

The present invention relates generally to the field of storage devices. More specifically, the present invention relates to a locked or hinged storage unit for storing valuables in an inconspicuous, secretive, and dry manner. The storage device, to be described in detail hereinafter, provides for an undetectable or out of reach storage compartment. Items to be stored vary and can include any valuables or items such as fishing rods and reels, jewelry, firearms, photographs, etc. The storage device, in one embodiment, hides valuables while protecting the gear from theft or damage and can ensure the gear remains intact and moisture free. The storage unit can be mounted to the ceiling, or within the ceiling, to preserve space while allowing for easy access. The device supports Bluetooth technology and a mounted motor that allows users to raise and lower the storage device while preventing damage and theft to the gear stored therein. The device further ensures the longevity of gear by keeping it in a secure and dry location. Accordingly, the present disclosure makes specific reference thereto. Nonetheless, it is to be appreciated that aspects of the present invention are also equally applicable to other like applications, devices, and methods of manufacture.

BACKGROUND OF THE INVENTION

By way of background, and to illustrate the type of valuable gear that can be stored in the device described herein, fishing gear will be described. It is to be appreciated that any and all types of gear and valuables can be similarly stored as the fishing gear detailed below. Millions of people around the world enjoy fishing, which is a popular recreational activity. Although a large segment of the fisherman population participates largely on a recreational level, it should be recognized that fishing is also one of the largest food-acquiring and producing industries in the world. Regardless of the reason for fishing, people of all ages enjoy doing so in streams, rivers, lakes, bays, and oceans as the climate and seasons of the year permit.

In the sport of fishing, there exists a large variety of methods of attracting and catching fish, including artificial lures, fishing rods, fishing reels and more. Usually, a fishing rod device comprises a long, flexible stick or pole, including a reel with a line attached thereto, ending in a hook at the end of the line. Typical rod lengths vary from about 2 feet to about 12 feet. To entice fish, bait or lures are impaled or tied on one or more hooks attached to the line of the fishing rods. However, fishing lines can quickly become entangled if not handled properly, thereby causing problems while using and storing fishing equipment.

Further, in between fishing trips, or during the off season, it can be difficult to find a proper storage location for one's fishing gear. Keeping rods in a shed, garage, or damp basement can lead to damaged rods, lines becoming entangled, and reels becoming rusted, all of which are frustrating and costly. Due to poorly chosen storage spaces, fishing poles can break and reels can become contaminated and rusted, thereby leaving the fishing gear damaged and unusable.

Additionally, when fishing rods and other similar fishing gear, are stored in a truck, garage, or other improper location, which is easily accessible and visible to others, there is always the risk of theft causing the user to absorb the financial loss of their fishing gear. Stolen gear also causes inconvenience to the users and increases the general expenses associated with the sport of fishing.

Therefore, there exists a long felt need in the art for a storage device for maintaining fishing gear such as fishing rods, or the like. There is also a long felt need in the art for a storage device which prevents the lines of the fishing rods from becoming entangled and ensures the lines remain in useable condition. Moreover, there is a long felt need in the art for a storage device which prevents the user from becoming frustrated and agitated while attempting to release entangled fishing lines. There is also a long felt need in the state of the art for a storage device which prevents fishing rods from being broken or damaged, or negatively impacted by ambient elements, thereby ensuring the fishing gear remain undamaged and in proper condition. Additionally, there is a long felt need in the art for a storage device which eliminates the need to store fishing rods in inconvenient locations such as in trucks, garage floors, damp basements or the like. Further, there is a long felt need in the art for a protective storage device that is inconspicuous and prevents the theft of fishing gear stored inside the device. Finally, there is a long felt need in the art for a storage device that can be easily mounted in a desired location while allowing easy access to the fishing gear for the user.

The subject matter disclosed and claimed herein, in one embodiment thereof, comprises a novel gear storage kit for protecting and storing fishing rods/gear and/or other items. The storage device comprises: a storage box designed to be mounted to ceiling studs; a companion smartphone application; the storage box having a base with a plurality of retention grooves; an electric motor to rotate pulleys wherein pulleys are attached to ceiling studs and to the box through hanging wires, ropes, or cables; the rotation enables the box to lower or raise vertically; and, wherein the storage box is controlled using the companion smartphone application (i.e. transmitter) remotely through a wireless communication channel. The wireless communication channel can be provided by a built-in wireless communication of the storage box. The storage box keeps the gear safe and accessible for the user. The storage device can include a compartment having a plastic outer shell for protecting the gear inside from harmful ambient conditions and moisture. The gear storage kit ensures the longevity of the gear by keeping it in a secure, inconspicuous location.

The subject matter disclosed and claimed herein, in another embodiment thereof, comprises a novel gear storage kit for protecting and storing fishing rods/gear and/or other items. The storage device comprises: a storage frame designed to be mounted to ceiling studs; the storage frame having a base with a plurality of retention mounts; a pair of hinges to rotate the frame from a horizontal mounted orientation to a vertical deployed orientation; and, wherein the storage frame movement from the horizontal orientation to the vertical orientation, and back again, can be assisted with a cable and pulley. The storage frame keeps the gear safe and accessible for the user while protecting the gear from harmful ambient conditions and moisture present at or near a floor of a building. The gear storage frame ensures the longevity of the gear by keeping it in a secure and inconspicuous location.

In this manner, the novel gear storage device of the present invention accomplishes all of the forgoing objectives, and provides a relatively safe, easy, convenient and cost-effective solution for keeping and storing gear, while protecting the stored gear from theft or damage in between uses. The gear storage device of the present invention is also user friendly, as it ensures that the gear stored therein remains protected from harmful contaminants and moist conditions. Further, the gear storage device ensures the longevity of the gear stored therein by keeping the storage device safe and inconspicuous.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a novel gear storage kit for protecting gear stored therein. The storage device comprises a storage box designed to be mounted to, or between, ceiling joists or studs; a companion smartphone application; the storage box having a base with a plurality of retention grooves; an electric motor to rotate pulleys wherein the pulleys are attached to ceiling studs and to the box through hanging wires, ropes, or cables; the rotation of the pulleys enables the box to lower or raise vertically; and, the storage box is controlled using the companion smartphone application (i.e. transmitter) remotely through a wireless communication channel. The wireless communication channel is provided by built-in wireless communication within the storage box. The storage box keeps the gear safe and accessible and includes a moisture-proof compartment having a plastic outer shell for protecting gear. The gear storage kit ensures the longevity of the gear stored therein by keeping it in a secure and inconspicuous location.

The subject matter disclosed and claimed herein, in another embodiment thereof, comprises a novel gear storage frame for protecting and storing fishing rods/gear and/or other elongated items. The storage device comprises: a storage frame designed to be mounted to ceiling studs; the storage frame having a base with a plurality of retention mounts; a pair of hinges to rotate the frame from a horizontal mounted orientation to a vertical deployed orientation; and, wherein the storage frame movement from the horizontal orientation to the vertical orientation, and back again, can be assisted with a cable and pulley. The storage frame keeps the gear safe and accessible for the user while protecting the gear from harmful ambient conditions and moisture present at or near a floor of a building. The gear storage frame ensures the longevity of the gear by keeping it in a secure and inconspicuous location.

In a further embodiment of the present invention, a storage box is disclosed and comprises: a rectilinear box having an enclosed storage compartment; a crank and gear mechanism for lowering and raising the storage box from a ceiling; a built-in electric motor actuated and controlled via a wireless communication channel by a companion smartphone application wherein the electric motor activates the crank and gear mechanism; and, the interior of the storage box includes retentions grooves, hooks, protrusions, and other mounts for organization and separation of the gear stored therein. The storage box can be mounted to ceiling studs using wood screws. The unit, in one illustrative example, can measure 7' wide, 12" in depth, and 6' to 8' long for storage of up to fifteen fishing poles or other items of elongated form. The storage box can include a plurality of side surfaces or walls extending up from a base and an enclosed compartment with a lid having a mechanical or electronic locking mechanism. The electronic locking mechanism can also be operated using the smartphone application. It should be appreciated that the electronic components, such as the electric motor, electronic locking mechanism, wireless communication module, processor and other similar elements can be present in all the embodiments and versions of the gear storage box and kit of the present invention.

In yet a further embodiment of the present invention, a method of securely storing gear using a storage box mounted to, or between, ceiling joists is disclosed and comprises the steps of: mounting the storage box to ceiling studs using wood screws; pairing the storage box with a companion smartphone application installed in an electronic device; providing a correct access code to access or open the storage box; bringing the storage box down by sending or transmitting a wireless instruction to an electric motor (i.e. receiver) of the storage box; storing the gear in the storage compartment of the storage box; activating the lock to close a lid; and, raising the storage box to the ceiling for securely storing and protecting the contents therein from damage and theft.

The advantage of the gear storage kit and box of the present invention is that it protects the gear from theft or damage in-between uses, and mounts to, or in, the ceiling to preserve space while allowing for easy access. The storage box further ensures that the gear stored therein remains organized and secure. The storage frame still further ensures that the gear stored thereon remains organized, dry, and secure. The invention prevents fishing poles, for example, from being damaged or stolen when not in use. The position of the storage device can be controlled remotely using a smartphone application.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments can be combined.

As noted above, there exists a long felt need in the art for a storage device for maintaining gear, such as fishing rods or other odd-shaped items. There is also a long felt need in the art for a storage device that can maintain the stored gear in a sorted and organized manner to ensure quick and easy access to the gear when needed. Moreover, there is a long felt need in the art for a storage device that prevents the user from becoming frustrated and agitated while untangling or separating various items from one another. There is also a long felt need in the state of the art for a storage device that prevents fishing rods from becoming broken and damaged, thereby ensuring the fishing gear, such as fishing rods, remain fit for use. Additionally, there is a long felt need in the art for a storage device that eliminates the need to store fishing rods at improper locations such as vehicles, garages, damp basements or the like. Further, there is a long felt need in the art for a protective storage device that prevents the theft of the gear stored therein. Finally, there is a long felt need in the art for a storage device that can be easily mounted while allowing convenient access to the gear stored inside.

The present invention, in one exemplary embodiment, is a novel gear storage kit for protecting gear comprising: a storage box designed to be mounted to ceiling studs; a companion smartphone application; the storage box having a base with a plurality of retention grooves; an electric motor to rotate pulleys wherein the pulleys are attached to ceiling studs and to the box through hanging wires, ropes, or cables; the rotation enables the box to lower or raise vertically; and, the storage box is controlled using the companion smartphone application remotely through a wireless communication channel. The wireless communication channel is provided by built-in wireless communication inside the storage box. The storage box keeps the gear safe and accessible and includes a storage compartment and a plastic outer shell for protecting the gear from the elements. The gear storage kit ensures the longevity of the stored gear by keeping it in a secure and dry location.

Figure 1:
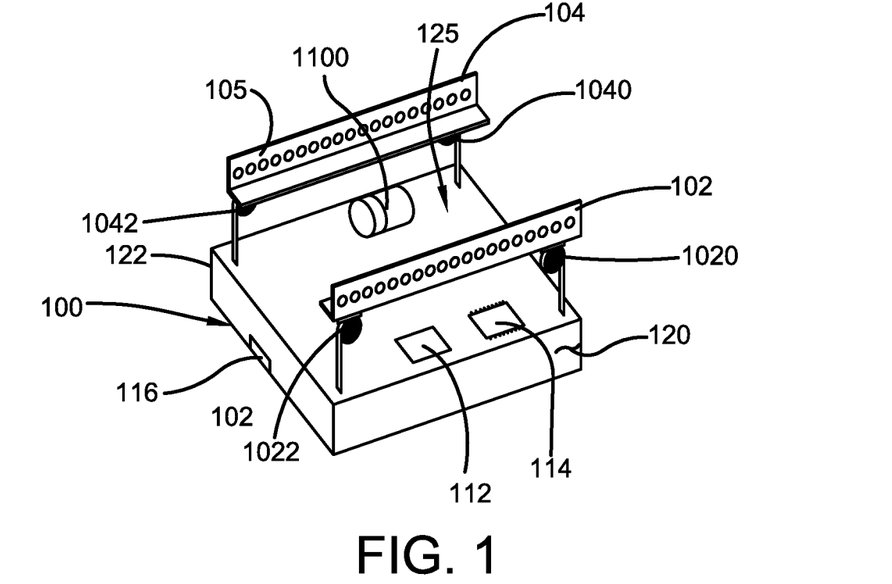
FIG. 1 illustrates a perspective view of one potential embodiment showing gear storage device of the present invention mounted to ceiling joists or studs in accordance with the disclosed architecture.

Referring initially to the drawings, FIG. 1 illustrates a perspective view of one potential embodiment showing a gear storage device of the present invention mounted to ceiling studs in accordance with the disclosed architecture. The gear storage device 100 is generally rectilinear and can be aligned with, and mounted to or between, a pair of ceiling joists. The storage box 100 can include a lockable cover having an electronic locking mechanism. The storage device 100 can include slots, grooves, hooks or dividers mounted inside the storage device 100 for sorting and storing fishing rods or lines. The storage box 100, of one potential embodiment, comprises four pulleys 1020, 1022, 1040, 1042 to mount to the ceiling studs or joists 102, 104. A first pulley 1020 and a second pulley 1022 can be installed to a first ceiling joist 102. A third pulley 1040 and a fourth pulley 1042 can be installed to a second ceiling joist 104. It is to be appreciated that joist 102 is adjacent to joist 104 in the construction and layout of the ceiling architecture. The pulleys 1020, 1022, 1040, 1042 provide support to suspend the storage box 100 and to facilitate the lowering of the storage box 100 from the ceiling studs, thereby enabling a user to easily access gear inside the storage box 100.

To provide automated operation of the storage box 100, a processor 114 can be employed to send instructions to the connected components, such as pulleys 1020, 1022, 1040, 1042, a wireless communication module 112, an electric motor 110, and a locking mechanism 116. It should be understood that elements or components of the storage device 100 can interact mechanically and/or electrically with one another. Electrical interaction between various elements of the storage device 100 can be through wired connections and/or wireless connections. The wireless communication module 112 can provide a wireless communication channel to connect to an electronic device. Based on instruction from the processor 114, the electric motor 110 can rotate the pulleys in clockwise or counterclockwise directions, respectively, to lower or raise the storage box 100.

The box 100 can include slots, grooves or dividers to secure and separate various fishing gear components. Access to the box 100 can be restricted to authorized users. The box 100 can include a depth to conveniently store fishing gear of other items. The box 100 can include side walls 120, 122 which are proximal to the inside surfaces 103, 105 of the joists 102, 104 when the box 100 is mounted between the joists 102, 104.

In one embodiment, the dimensions of the box 100 are 6'(L)×4'(W)×1'(D). Alternatively, the dimensions of the box 100 are 5'(L)×1.5'(W)×1'(D). Still alternatively, the dimensions of the box 100 are 7'(L)×1.0'(W)×1'(D). The device 100 can be mounted using wood screws screwed into the wooden joists 102, 104. It is to be appreciated that typical joists used in home construction are in the range from 2"×6" to 2"×12" and spaced at 16" or 24" centers. In one preferred embodiment, the device 100 can measure 7' wide, 12" in depth, and 6' to 8' long for storage of a plurality of rod and reel combinations. The box 100 can also have an internal battery such as an Li-Ion battery for powering the motor 110.

Figure 2:
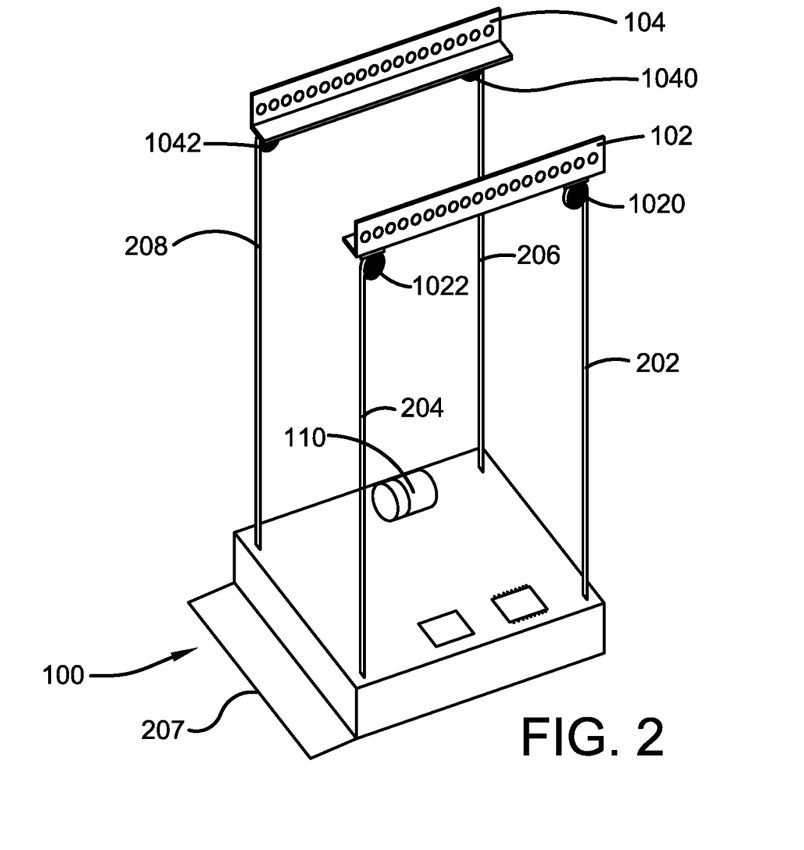
FIG. 2 illustrates a perspective view of one potential embodiment showing gear storage device of the present invention in a lowered position with the hanging wires in accordance with the disclosed architecture.

FIG. 2 illustrates a perspective view of one potential embodiment showing a gear storage device of the present invention in a lowered position with the hanging cables or wires in the extended, deployed, or unspooled orientation. To access the storage space of the storage box 100, the storage box 100 is released from its resting or stored position adjacent the ceiling studs 102, 104, to a released or deployed position in which the box 100 is lowered to an accessible height for easy accessibility to the interior of the box 100. The electric motor 110 operates to actuate the pulleys 1020, 1022, 1040, 1042 into rotational motion to unwind or unspool the hanging cables or wires 202, 204, 206, 208, respectively, whereby the connected box 100 is lowered to a desired height. The distance of movement (i.e. travel) to the box 100 from the stored position to the deployed position is generally about 2 feet to about 16 feet. In typical residential applications, the distance of movement (i.e. travel) to the box 100 from the stored position to the deployed position is generally about 4 feet to about 8 feet. Also, the locking mechanism can be unlocked to provide access to the interior 125 of the box 100 upon opening the door 207.

Figure 3:
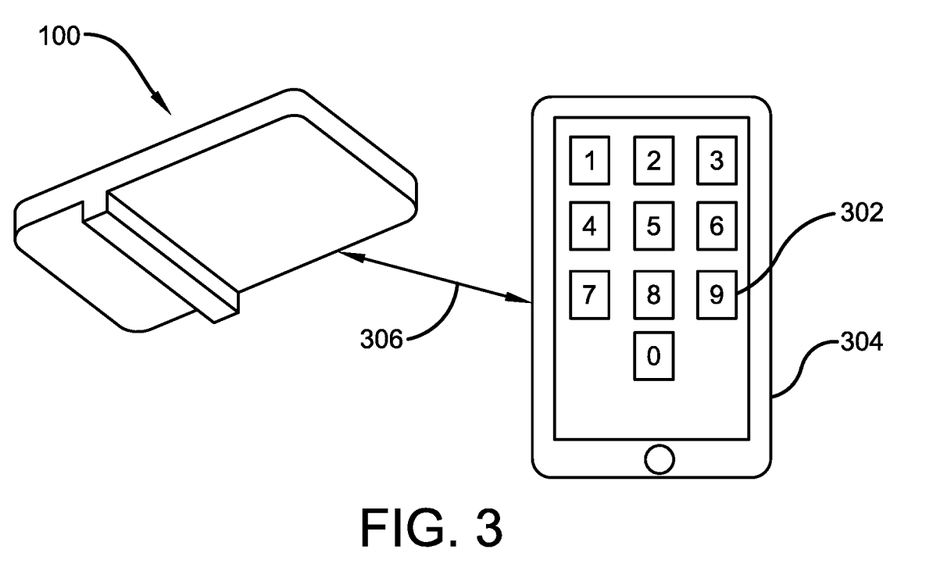
FIG. 3 illustrates a perspective view of one potential embodiment showing wireless connection between gear storage device of the present invention and an electronic device in accordance with the disclosed architecture.

FIG. 3 illustrates a perspective view of one potential embodiment showing a wireless connection between the gear storage device 100 of the present invention and an electronic device in accordance with the disclosed architecture. The gear storage device 100 mounted to the studs 102 of a ceiling 104 can include a companion smartphone application 302 installed on a smartphone 304. The smartphone application 302 can be downloaded from a mobile application store such as Google® Play Store or Apple® App Store. The smartphone application 302, via use of the wireless module of the smartphone 304, pairs to the storage device 100 using a wireless channel 306 such as Bluetooth/Wi-Fi/Wi-Fi Direct. After pairing, the gear storage device 100 can be controlled using the control buttons on the user interface (i.e. transmitter) of the smartphone application 302.

A user can unlock and access the gear storage device 100 using the smartphone application 302 by inputting an access code. After accessing the storage device 100, the user can provide instructions to lower the storage device 100, raise the storage device 100 or lock the storage device 100. It is to be appreciated that a user doesn't need to climb up a ladder or step stool to gain access to the storage device 100 within the ceiling recess.

Upon receiving a wireless instruction from the smartphone application 302, an instruction is sent by a processor 114 to an electric motor 110 of the storage device 100 to selectively raise or lower the storage device 100. Similarly, to selectively lock or unlock the storage device 100, an instruction is sent by a processor 114 to a lock 116 on the storage device 100.

In one exemplary embodiment, a camera from a smartphone 304 can be used to scan a QR code present on the surface of the storage device 100 to pair with the storage device 100. Once paired, the smartphone 304 can send instructions wirelessly to control the operations of the storage device 100.

The smartphone or communication device 304 can utilize or comply with one or more communication formats, protocols or systems including: cellular communication standards, LTE, UMTS, WiMAX, CDMA, GSM, Bluetooth Low Energy, Bluetooth Smart, Wireless Fidelity (Wi-Fi), Zigbee, ANT, ANT+, Thread, Internet Protocol (IP), Near Field Communication (NFC), proprietary formats or protocols and/or combinations thereof.

The storage device 100 is configured to receive and store a variety of gear, and in one exemplary configuration is particularly suited for storing long and relatively lightweight items (i.e. fishing rods and reels). As described in further detail in other examples, the storage device 100 can include one or more storage compartments or cavities that can be mounted between ceiling joists and can include a bottom surface similar to the surrounding ceiling for inconspicuous storage. The one or more storage compartments can each include one or more locking features to enable the gear to be secured and only accessed by authorized users. As stated earlier, the locking system can include an electronic lock that can be remotely locked or unlocked by an electronic device 304.

Figure 4:
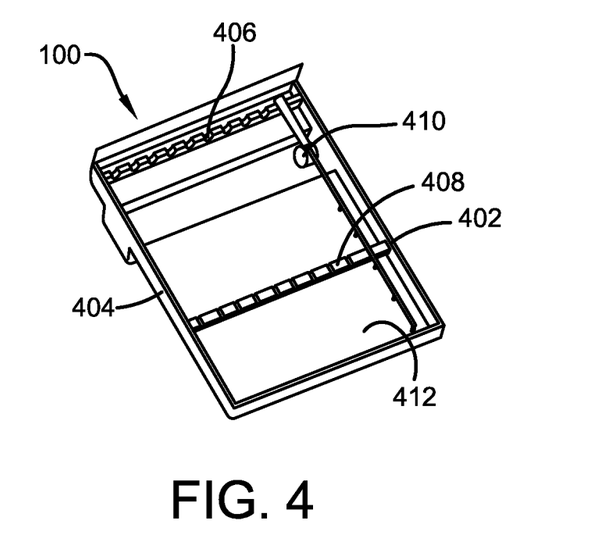
FIG. 4 illustrates a perspective view of one potential embodiment showing bottom view of gear storage device of the present invention in accordance with the disclosed architecture.

FIG. 4 illustrates a perspective view of one potential embodiment showing a bottom view of the gear storage device of the present invention in accordance with the disclosed architecture. The cavity bottom surface 412 of the gear storage device 100 can include a plurality of first retention grooves 406 and a plurality of second retention grooves 408 to securely store a fishing rod and reel 410. A plurality of fishing rods and reels can be securely stored in the box 100 using the plurality of first retention grooves 406 and the plurality of second retention grooves 408. The side surfaces 402, 404 can be mounted to the inside surfaces of adjacent ceiling joists to achieve a flush mounting arrangement between the bottom surface 412 and the ceiling. Pulleys can be attached to the side surfaces 402, 404 or the top surface of the box 100 (not illustrated), for selectively lowering and raising the storage device 100.

The box 100 is generally rectilinear shape can be dimensioned to fit in between the ceiling joists and can be manufactured in various sizes in accordance with the standard ceiling joist gaps and dimensions. Typical joist spacings are 16" or 24" from center to center of adjacent joists. Thus, a box having a width of 12", for example, can be mounted between 16" joist spacings. A box having a width of 20", for example, can be mounted between 24" joist spacings.

Figure 5:
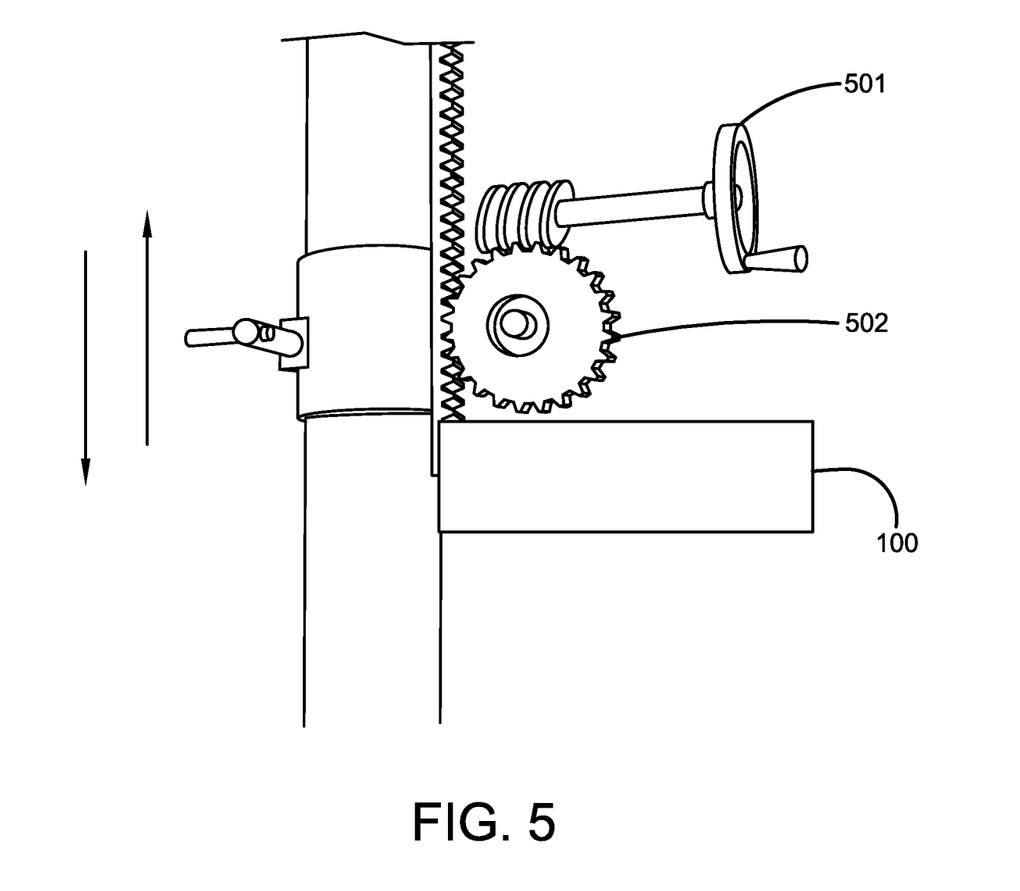
FIG. 5 illustrates crank and gear mechanism in accordance with another embodiment of the present invention to lower and raise storage box of the present invention.

FIG. 5 illustrates a crank and gear mechanism in accordance with another embodiment of the present invention to lower and raise the storage box of the present invention. As shown, a crank handle 501 can be rotated under the effect of an electric motor which causes the wheel gear 502 to rotate selectively in two directions in order to lower and raise the storage box. The crank handle 501 and wheel gear 502 can be dimensioned to maintain an inconspicuous arrangement so as not to attract the attention of thieves. The side surfaces 120, 122, of the storage device 100, are opposite and parallel to each other. The box 100 can be made up of wood, heavy plastic or other lightweight materials that can support a load weight between 5 and 50 pounds.

The side walls and the pulleys can be detachable from the joists, and a lid can be used to cover the gear therein to further protect from ambient conditions and contaminants. In one embodiment, the retention grooves are formed of elastic bands which can stretch to fit fishing reels and rods of different sizes. The retention grooves facilitate the organization and separation of the fishing gear for secure and hassle-free storage.

To use the storage box to securely store gear; a user mounts the storage box to ceiling joists using wood screws; the storage box is paired with a companion smartphone application installed in an electronic device; thereafter the storage box is lowered by sending a wireless instruction to an electric motor integrated within the storage box; a gear is placed in the storage device; the lock is activated to close the lid; and the storage box is raised to the ceiling for securely storing and protecting the contents therein from being damaged or stolen when not in use. In one embodiment, the storage box 100 can have an exterior surface of a luminous material. Alternatively, LED illumination can be mounted on the exterior surface of the storage box and temporarily illuminated while the storage box 100 is in use.

Figure 6:
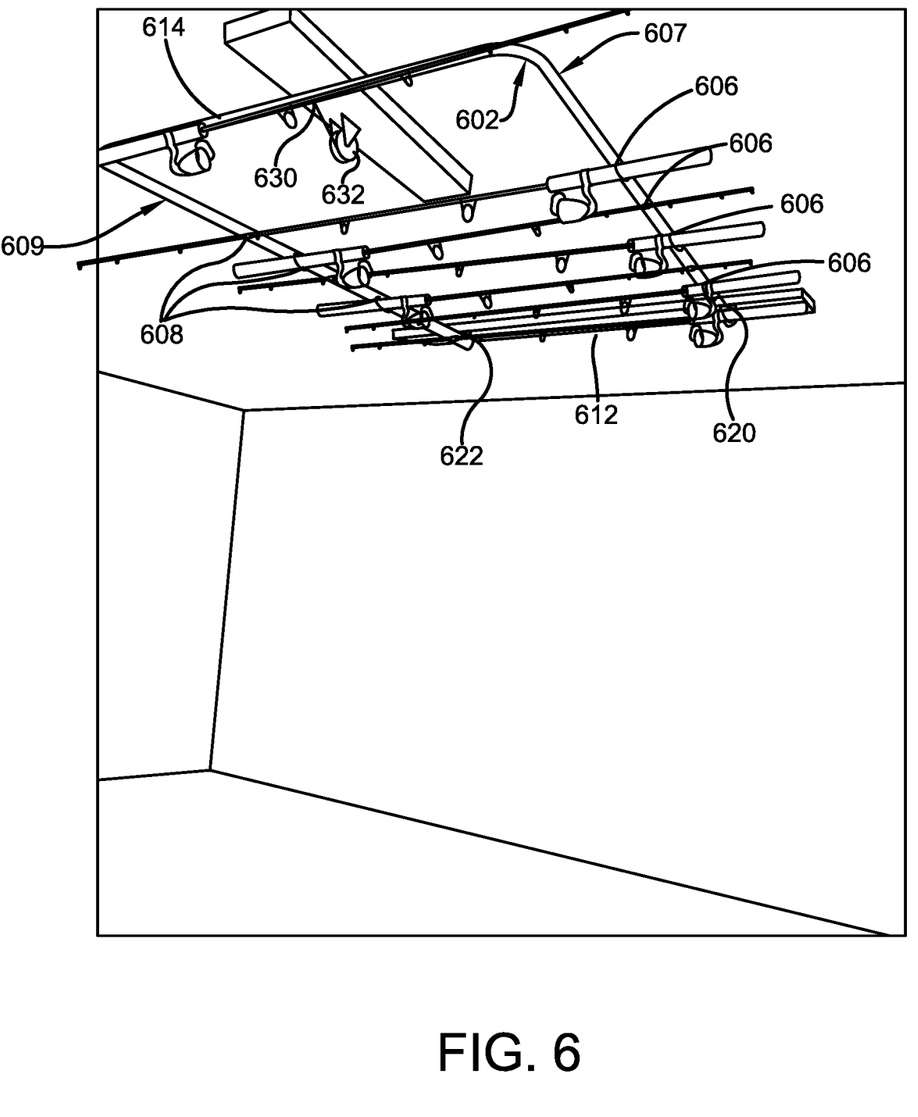
FIG. 6 illustrates a perspective view of another potential embodiment showing a view of a storage frame in a horizontal storage orientation in accordance with the disclosed architecture.
Figure 7:
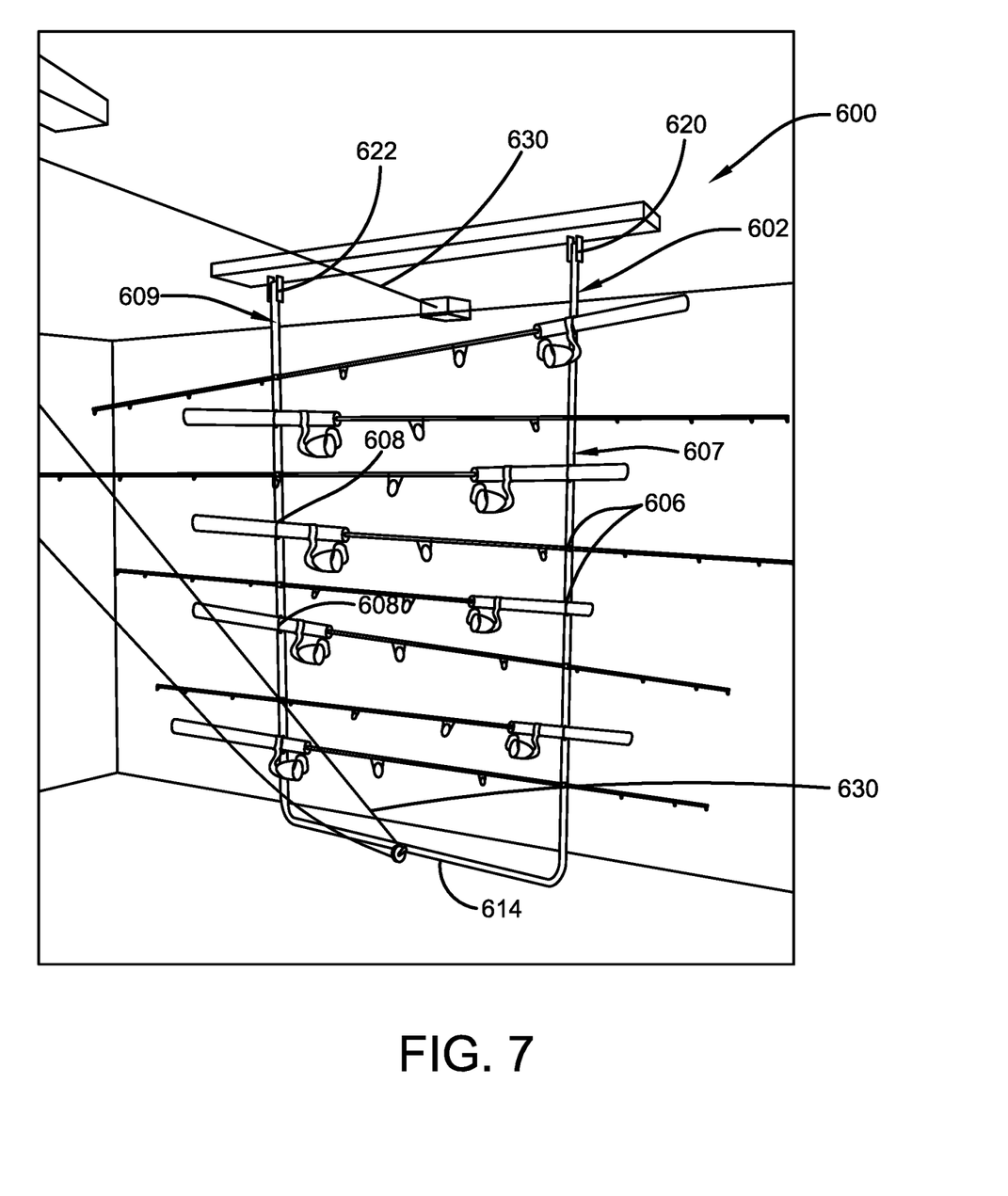
FIG. 7 illustrates a perspective view of another potential embodiment showing a view of the storage frame of FIG. 6 in a vertical deployed orientation in accordance with the disclosed architecture.

FIGS. 6 and 7 illustrate perspective views of another potential embodiment of the invention showing perspective views of a gear storage frame, respectively, in a mounted storage orientation and in a deployed vertical orientation. The gear storage frame 602 of the gear storage device 600 can include a plurality of first retention mounts or elastic bands 606 on one side 607 of the frame 602 and a plurality of second retention mounts or elastic bands 608 on another opposing side 609 of the frame 602. A pair of aligned mounts 606, 608 can be used to secure a single fishing rod (or rod/reel combination) thereto. It is to be appreciated that a plurality of fishing rods and reels can be securely mounted to frame 602 wherein each rod and reel uses a respective pair of aligned mounts 606, 608. Frame 602 includes another pair of opposing sides 612, 614. Side 612 can include a pair of hinges 620, 622 for mounting to a ceiling joist. Once mounted, hinges 620, 622 provide a pivot mechanism for frame 602 to pivot from a horizontal stored position (FIG. 6) to a vertical deployed position (FIG. 7). The other opposing side 614 can include a retention mechanism. In one illustrative example, the retention mechanism includes a cable 630 connected at one end to side 614 and connected at another end to a retention anchor accessible to a user (not illustrated). Cable 630 can be manually pulled down by a user, whereby side 614 displaces upward and the frame 602 rotates to the horizontal orientation. Pulling of the cable 630 can be assisted with one or more pulleys 632. Accordingly, one side 612 of frame 602 is mounted to a ceiling joist for a secure attachment thereto. Manually releasing cable 630 allows the frame 602 to pivot downward into a generally vertical orientation as shown in FIG. 7. The frame 602 can be made from heavy plastic, PVC pipe, metal plumbing pipe, or other rigid materials that can support a load weight up to 75 pounds. In one example, the mounts 606, 608 can be formed of elastic bands which can stretch to fit fishing reels and rods of different sizes. The retention bands facilitate the organization and separation of the fishing gear for secure and hassle-free storage. The storage frame 602 can include a height generally about 6 feet to about 10 feet. The storage frame 602 can include a width generally about 2 feet to about 6 feet. It is to be appreciated that the second or opposing side 614 displaces from a position proximal to a ceiling to a position proximal to the floor when the storage frame 602 is rotated from the stored position to the deployed position. The displacement of the second side can be generally about 4 feet to about 12 feet.

Figure 8:
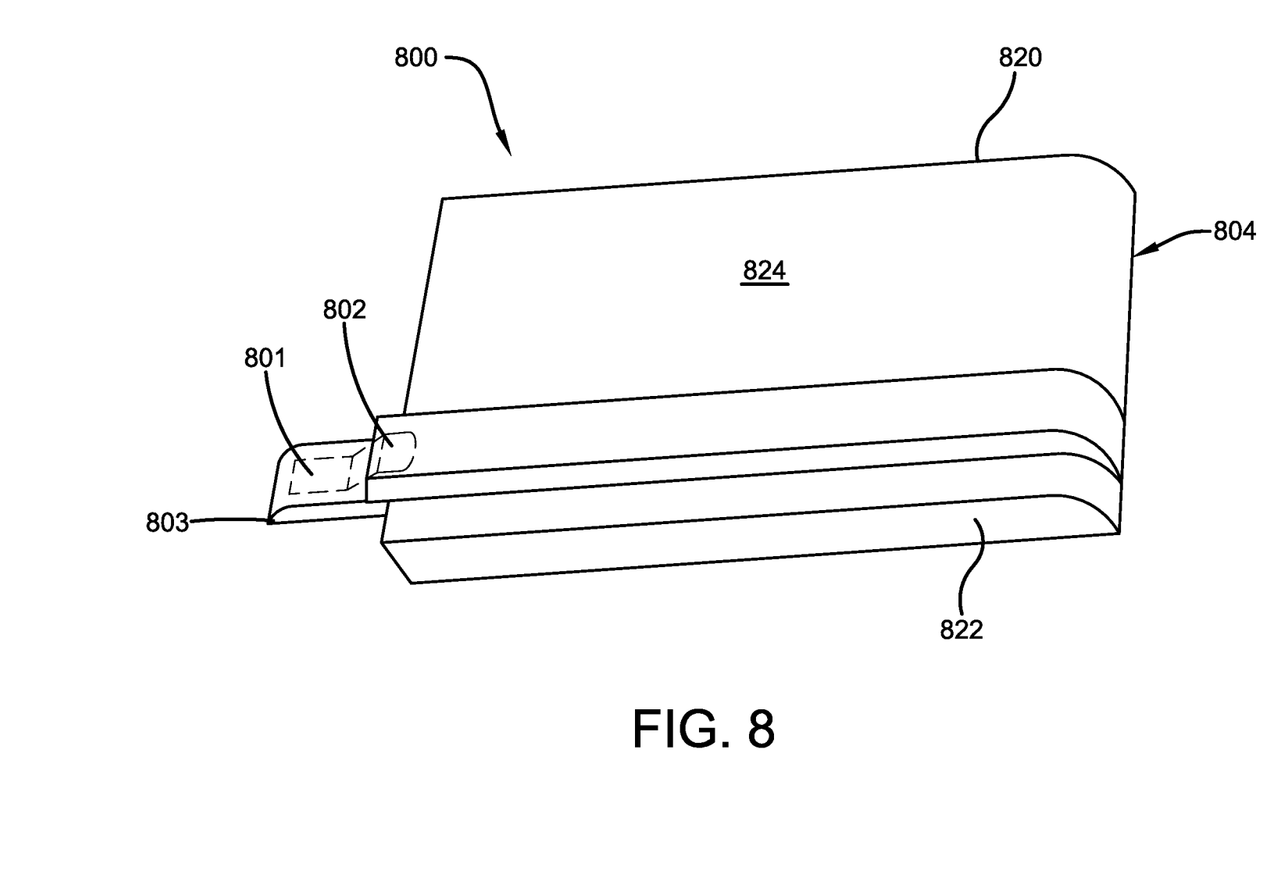
FIG. 8 illustrates a perspective view of yet another potential embodiment of the present invention illustrating a view of a storage shell and frame, including a motor and gear mechanism for actuating said storage shell and frame.
Figure 9:
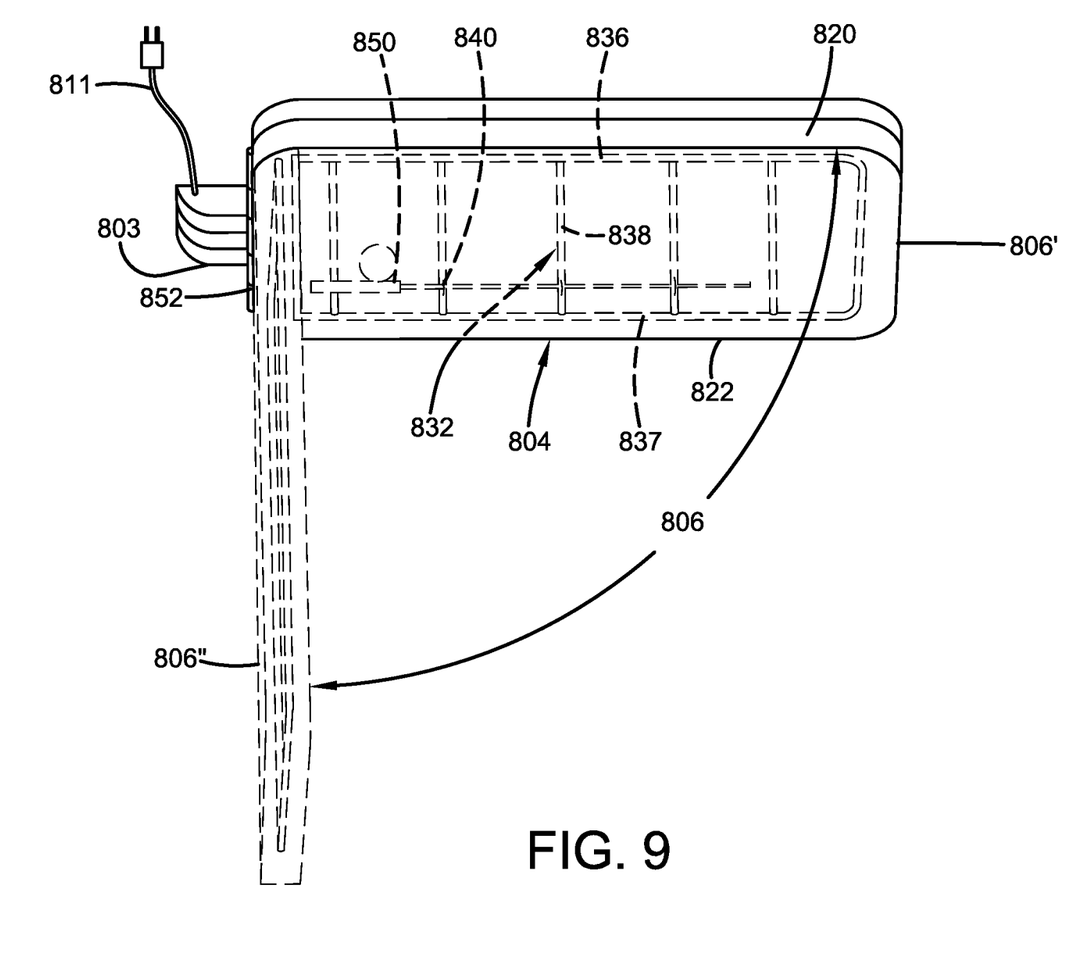
FIG. 9 illustrates perspective views of the storage shell and frame of FIG. 8 in a stored orientation and a deployed orientation in which the storage device is selectively actuated by the motor and gear mechanism to pivot from a raised position to a lowered position.

FIGS. 8 and 9 illustrate a motor and gear mechanism in accordance with another embodiment of the present invention to lower and raise (i.e. actuate) a shell and storage frame of the present invention. As shown, a storage device 800 includes a motor 801 that can be actuated for rotating a wheel gear 802. The wheel gear 802 rotates under the effect of the electric motor 801 which causes the wheel gear 802 to rotate selectively in two directions in order to pivot the shell 804 from a generally horizontal stored position 806' to a generally vertical deployed position 806". The motor 801 can be a 110 v motor including a cord and plug 811 for connection to an electrical outlet. The motor 801 and wheel gear 802 can be dimensioned to maintain an inconspicuous arrangement so as not to attract the attention of thieves. It is to be appreciated that the motor 801 can be disengaged from the wheel gear during power outages. Once the motor is disengaged, the shell 804 can be manually pivoted by pulling on the side of the shell 804 distal to the motor 801 and wheel gear 802. The storage device 800 includes side surfaces or walls 820,822, and a planar bottom surface 824 therebetween. The side walls 820,822 are opposing and parallel to each other. The storage device 800 can be made up of wood, heavy plastic, or other lightweight materials that can support a load weight between 5 and 80 pounds.

The motor 801 can be detachable from the joists, and a lid 803 can be used to cover the motor 801 and gears 802 therein to further protect from viewing, ambient conditions, and contaminants. In one embodiment, the retention grooves or mounts of the storage frame are formed of elastic bands which can stretch to fit fishing reels and rods of different sizes. The retention grooves or mounts facilitate the organization and separation of the fishing gear for secure and hassle-free storage. In another embodiment, the retention grooves or mounts are formed of carabiners which can be hingedly opened to fit fishing reels and rods of different sizes. The retention grooves or mounts facilitate the organization and separation of the fishing gear for secure and hassle-free storage.

To use the storage device 800 to securely store gear; a user mounts the storage device to ceiling joists using, for example, wood screws; the storage device 800 can be paired with a companion smartphone application installed in an electronic device; thereafter the storage device is lowered by sending a wireless instruction to the electric motor 801 integrated within the storage device 800; the gear 802 can be placed in the storage device 800; and, the storage device 800 is rotated to the ceiling for securely storing and protecting the contents therein from being damaged or stolen when not in use. It is to be appreciated that the upper terminal edge of the shell 804 can include a rubber or compressible seal for controlling ambient air from entering therein (not illustrated). In one embodiment, the storage device 800 can have an exterior surface of a luminous material. Alternatively, LED illumination can be mounted on the exterior surface of the storage device and temporarily illuminated while the storage device 800 is in use.

FIG. 9 illustrates perspective views of the invention showing perspective views of the storage device 800 in a mounted storage orientation 806' and in a deployed generally vertical orientation 806". The gear storage frame 832 of the gear storage device 800 can include a plurality of retention mounts, carabiners, or elastic bands 840 affixed to cross members 838 of the frame 832. The cross members 838 connect to outer frame members 836,837. A plurality of aligned mounts 840 can be used to secure a single fishing rod (or rod/reel combination) 850 thereto. It is to be appreciated that a plurality of fishing rods and reels can be securely mounted to frame 832 wherein each rod and reel uses a respective plurality of aligned mounts 840. The storage device 800 includes an axle or hinge 852 for pivoting 806 the shell 804 and frame 832 from the storage position 806' to the deployed position 806". Once mounted, the hinge 852 provides the pivot mechanism for the shell 804 and frame 832 to pivot from a horizontal orientation to a vertical orientation.

The frame 832 can be made from heavy plastic, PVC pipe, metal plumbing pipe, or other rigid materials that can support a load weight up to 75 pounds. In one example, the mounts 840 can be formed of elastic bands which can stretch to fit fishing reels and rods of different sizes. The retention bands facilitate the organization and separation of the fishing gear for secure and hassle-free storage. In another example, the mounts 840 can include carabiner rings for the fishing rod to fit therethrough. The shell 804 and storage frame 832 can include a height generally about 6 feet to about 10 feet. The shell 804 and storage frame 832 can include a width generally about 2 feet to about 8 feet. It is to be appreciated that the shell 804 and frame 832 displaces from a position proximal to a ceiling to a position orthogonal to the floor when the shell 804 and frame 832 is rotated 806 from the stored position to the deployed position.

To use the storage frame to securely store gear; a user mounts the storage frame to a ceiling joist(s) using wood screws; thereafter the storage frame is lowered to a generally vertical orientation by releasing tension of a cable, or actuating a motor, connected to one side of the storage frame; the storage frame can then be used to mount fishing rods/reels thereto; and, the storage frame is raised to the ceiling by pulling on the cable or actuating the motor thereby rotating the storage frame to a generally horizontal orientation proximal to a ceiling for securely storing and protecting the contents thereon from being damaged or tangled when not in use.

Certain terms are used throughout the following description and claims to refer to particular features or components. As one skilled in the art will appreciate, different persons can refer to the same feature or component by different names. This document does not intend to distinguish between components or features that differ in name but not structure or function. As used herein "fishing rod storage device", "storage device", "box", and "gear storage device" are interchangeable and refer to the gear storage device 100, 600, 800 of the present invention.

Notwithstanding the forgoing, the gear storage device 100, 600, 800 of the present invention can be of any suitable size and configuration as is known in the art without affecting the overall concept of the invention, provided that it accomplishes the above-stated objectives. One of ordinary skill in the art will appreciate that the size, configuration, and material of the gear storage device 100, 600, 800 as shown in the FIGS. are for illustrative purposes only, and that many other sizes and shapes of the gear storage device 100, 600, 800 are well within the scope of the present disclosure. Although the dimensions of the gear storage device 100, 600, 800 are important design parameters for user convenience, the gear storage device 100, 600, 800 can be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A storage device configured to provide inconspicuous storage of an item, the storage device comprising:
    a storage frame including a first side hingedly retained to a ceiling joist via a pair of hinges;
    a cable including a first end attached to at least a second side of said storage frame;
    at least one pulley;
    said cable including a second end accessible by a user;
    said storage frame selectively rotatable from a deployed generally vertical orientation to a stored generally horizontal orientation when said cable is pulled by the user;
    wherein the at least one pulley supports said cable therethrough when said cable is pulled by the user to rotate said storage frame;
    wherein said storage frame rotatable from said stored orientation to said deployed orientation includes a rotation of said second side from a first position proximal to the ceiling to a second position proximal to the floor;
    said storage frame accessible to a user in said deployed orientation; and
    said storage frame inaccessible to a user in said stored orientation; and
    wherein said storage frame includes a plurality of cross members having a plurality of carabiners attached thereto for retaining an individual fishing rod and reel; and
    wherein an exterior surface of said storage frame is luminous.

2. The storage device of claim 1, wherein said storage frame in said stored orientation is retained by at least two ceiling joists.

3. The storage device of claim 2, wherein said storage frame includes a height and said height is generally about 6 feet to about 10 feet.

4. The storage device of claim 3, wherein said storage frame includes a width and said width is generally about 2 feet to about 6 feet.

5. The storage device of claim 4, wherein said storage frame further comprises a third side and a fourth side, said third side includes a plurality of elastic bands and said fourth side includes a plurality of elastic bands wherein a pair of aligned elastic bands between said third side and said fourth side are used to retain an individual fishing rod and reel.

6. The storage device of claim 4, further comprising an electric motor connected to said at least one pulley, wherein said electric motor is in wireless communication with an electronic transmitter, and further wherein said electronic transmitter commands said electric motor to rotate said at least one pulley selectively from a wound position to an unwound position.

7. The storage device of claim 6, wherein said electronic transmitter is a smartphone.

8. A storage device configured to provide inconspicuous storage of an item, the storage device comprising:
- a storage frame including a first side pivotally retained to a ceiling joist;
- a motor and a gear attached to an axle for pivoting said storage frame;
- said storage frame selectively rotatable from a stored generally horizontal orientation to a deployed generally vertical orientation when said motor is actuated;
- wherein said storage frame rotatable from said stored orientation to said deployed orientation includes a rotation of said storage frame from a first position proximal to the ceiling to a second position orthogonal to the floor;
- said storage frame accessible to a user in said deployed orientation; and
- said storage frame inaccessible to a user in said stored orientation; and
- wherein said motor is an electric motor in wireless communication with an electronic transmitter, and further wherein said electronic transmitter commands said electric motor to rotate said gear selectively from a first position to a second position; and
- wherein said storage frame electronically lockable via the electronic transmitter; and
- wherein said storage frame includes a plurality of cross members having a plurality of carabiners attached thereto for retaining an individual fishing rod and reel; and
- wherein the storage frame seals to prevent air movement when in the stored generally horizontal orientation.

9. The storage device of claim 8, wherein said storage frame in said stored orientation is retained by at least two ceiling joists.

10. The storage device of claim 9, wherein said storage frame includes a height and said height is generally about 6 feet to about 10 feet.

11. The storage device of claim 10, wherein said storage frame includes a width and said width is generally about 2 feet to about 8 feet.

12. The storage device of claim 8, wherein said electronic transmitter is a smartphone.

* * * * *